Patented May 13, 1941

2,241,538

UNITED STATES PATENT OFFICE 2,241,538

PLASTIC COMPOSITION

William I. Buckeridge, Chicago, Ill., assignor to Standard Oil Company, Chicago, Ill., a corporation of Indiana No Drawing. Application January 28, 1938,
Serial No. 187,402

10 Claims. (Cl. 260—28)

This invention relates to improvements in moulded plastics and more particularly to improvements in plastic flooring and composition floor tiles.

Plastic flooring and floor tile usually consist of gilsonite, a resin such as cumar resin, a plastic such as stearine pitch, drying oils such as soya bean oil, linseed oil, etc., asbestos fibers, pigments and a mineral filler such as talc. Composition floor tiles are prepared by masticating the mixture of the aforementioned ingredients on hot rolls or in heated mixers. The plastic mass while still hot is formed into sheets, polished, if desired, and cut into pieces of the desired shapes and dimensions. While composition floor tiles containing these constituents are suitable for most purposes they possess certain undesirable properties. For example, tile containing soya bean oil continues to harden and become brittle so that the tile must be set in place within a few days after it is manufactured. This does not permit the manufacture of large quantities of tile for future use. Furthermore the use of soya bean oil in floor tiles does not permit the mixing of scrap tiling with new stock. Floor tile prepared by mixing scrap and new stock in which soya bean oil is used becomes too hard and brittle. When using soya bean oil in the mixture excessive milling causes the material to crumble so that the milling time must be carefully controlled. The use of linseed oil in the preparation of floor tile is undesirable since it causes the floor tile to harden too rapidly. Another undesirable characteristic of floor tile as heretofore made and in particular, floor tile made from stearine pitch is that the tile containing this constituent is very sensitive to soap solutions and other common detergents or cleansers.

It is the object of the present invention to prepare a floor tile which will age at a desirable rate and which will not become brittle upon aging. It is another object of the invention to provide a floor tile which is not affected by soap solutions or other common detergents. It is a further object of the present invention to provide a floor tile composition which will permit the reworking of scrap tile with new stock. Still another object of the invention is to provide a floor tile composition which will not become crumbly with excessive milling and which will permit the operation of the mixing rolls at a lower temperature. Still another object of the present invention is to provide a floor tile which does not increase in hardness upon aging so that the same may be manufactured in large quantities and stored until needed.

I have discovered that all of the foregoing objects may be attained by substituting for all of the drying oil, such as the soya bean oil and the linseed oil, and all or a portion of the pitch in the floor tile composition, a product obtained in the solvent extraction of lubricating oils. I have found that a superior floor tile may be fabricated when using the extract obtained in the solvent extraction of petroleum oils, particularly lubricating oils, with beta-beta'-dichlorethyl ether, more commonly known under the trade mark "Chlorex". The extract is obtained by treating mineral lubricating oils with Chlorex in the manner described in U. S. Patent 2,003,233 and in the Oil and Gas Journal for May 16, 1935, page 54. Although I prefer to use the extract obtained by the solvent extraction of petroleum lubricating oils with Chlorex the invention contemplates the use of the extract obtained in the solvent extraction of petroleum lubricating oils with other solvents such as for example furfurol, phenol, nitrobenzine, liquefied sulfur dioxide and other suitable solvents.

In the solvent extraction of mineral lubricating oils with solvents the extraction may be carried out in a single stage or a plurality of stages. The extract used in the processing of floor tile may be that obtained from either a single stage extraction process or from any intermediate stage of a multiple stage extraction process, or the extract may be the composite of a multiple stage extraction process. By the way of example, the extract obtained by the extraction of 20 to 50 S. A. E. motor oils having the characteristics shown in Table I may be used for this purpose.

Table I

Gravity _____ 420–500° F. (minimum
Flash _____ 8–15° A. P. I.
    temperatures)
Pour point _____ 20–80° F. (maximum
    temperatures)
Saybolt viscosity at 210° F.. 75–550 seconds
Iodine No. _____ 15–40

The extract from oil fractions of different viscosities may be used as such, or the extracts from oils of different viscosities may be combined to obtain an extract having the desired properties.

I have found the extract obtained by the Chlorex extraction of a 50 S. A. E. motor oil, which has not been acid treated, to be very well suited. This extract has the characteristics shown in Table II:

Table II

| | |
|---|---|
| Gravity | 8–10° A. P. I. |
| Flash | Above 500° F. |
| Pour point | Less than 80° F. |
| Saybolt viscosity at 210° F | 500–550 seconds |
| Iodine No. | 15–40 |

Using from about 1% to about 20% of this Chlorex extract in floor tile compositions containing in addition thereto 22–32% of a binder, 0–17% of a pitch and 55–65% asbestos, finished products which retain their original hardness and which are not affected by soaps and other cleansing materials have been made. Moreover, no difficulty has been experienced in reworking scrap tiling with fresh material when Chlorex extract has been used in the formula. The specific formula shown in Table III have been found to produce a much improved floor tile.

Table III

| | 1 | 2 | 3 |
|---|---|---|---|
| Cumar resin per cent | 27.2 | 27.2 | 27.2 |
| Stearine pitch do | 12.3 | 9.8 | |
| Chlorex extract do | 1.2 | 3.7 | 13.5 |
| Asbestos do | 59.3 | 59.3 | 59.3 |

It is understood, of course, additional fillers, such as talc, and pigments for producing different colored tiles, may be used in the above formula which are given merely as examples of the invention.

As used herein and in the appended claims by the term "extract" is meant the extract after the solvent had been removed. In other words, it is the substantially solvent-free extract.

While I have described my invention with specific embodiments thereof, it is to be understood that the same are merely illustrative of the invention and not limitative thereof, except insofar as the same are defined in the appended claims.

I claim:

1. A new molded composition of matter comprising a resin, a filler and an extract obtained by the solvent extraction of petroleum lubricating oils with beta-beta'-dichlorethyl ether, said extract being characterized by a low iodine value.

2. A new molded composition of matter comprising cumar resin, stearine pitch, a filler and beta-beta'-dichlorethyl ether extract of petroleum lubricating oils said composition being resistant to cleansing solutions and to deterioration caused by aging.

3. A floor tile comprising a resin, asbestos and from about 1% to about 20% of the extract obtained by the extraction of petroleum lubricating oils with beta-beta'-dichlorethyl ether.

4. An improved floor tile comprising about 27% cumar resin, 59% asbestos and about 14% of the ether extract obtained by the extraction of petroleum lubricating oils with beta-beta'-dichlorethyl ether.

5. In the process of preparing composition moulded floor tile containing a resin, a pitch and a filler the improvement which comprises adding to the composition mass the extract obtained by extracting a petroleum lubricating oil with beta-beta'-dichlorethyl ether thereby producing a molded floor tile which is resistant to cleansing solutions and to deterioration and brittleness caused by aging.

6. In the process of preparing composition moulded floor tile containing a resin, a pitch and a filler the improvement which comprises adding to the composition mass from about 1% to about 20% of the extract obtained by extracting a petroleum lubricating oil with beta-beta'-dichlorethyl ether thereby producing a molded floor tile which is resistant to cleansing solutions and to deterioration and brittleness caused by aging.

7. A moulded plastic as described in claim 2 in which the extract has the following characteristics:

| | |
|---|---|
| Gravity | 8–15° A. P. I. |
| Flash | Above 420° F. |
| Pour point | Less than 80° F. |
| Saybolt viscosity at 210° F | 75–550 seconds |
| Iodine No | 15–40 |

8. The process described in claim 5 in which the extract has the following characteristics:

| | |
|---|---|
| Gravity | 8–10° A. P. I. |
| Flash | Above 500° F. |
| Pour point | Less than 80° F. |
| Saybolt viscosity at 210° F | 500–550 seconds |
| Iodine No | 15–40. |

9. A new composition of matter consisting of from about 22% to 32% of a binder, less than 17% of a pitch, 59% to 65% of a filler, and from 1% to about 20% of the extract obtained by the extraction of petroleum lubricating oils with beta-beta'-dichlorethyl ether.

10. A molded floor tile comprising cumar resin, a filler, and a mixture of a pitch and a beta-beta'-dichlorethyl ether extract of petroleum lubricating oils, said mixture comprising a major portion of said extract.

WILLIAM I. BUCKERIDGE.

CERTIFICATE OF CORRECTION.

Patent No. 2,241,538. May 13, 1941.

WILLIAM I. BUCKERIDGE.

It is hereby certified that error appears in the printed specification of the above numbered patent requiring correction as follows: Page 1, second column, lines 40, 41 and 42, Table 1, for "Gravity -------- 420-500° F. (minimum
Flash ---------- 3-15° A. P. I.
temperatures)"

read

Gravity -------- 8-15° A. P. I.
Flash ---------- 420-500° F. (minimum temperatures);

and page 2, second column, line 6, claim 4, strike out "ether"; and that the said Letters Patent should be read with this correction therein that the same may conform to the record of the case in the Patent Office.

Signed and sealed this 1st day of July, A. D. 1941.

(Seal)

Henry Van Arsdale,
Acting Commissioner of Patents.